United States Patent [19]

Burrill et al.

[11] Patent Number: 5,549,456
[45] Date of Patent: Aug. 27, 1996

[54] AUTOMATIC PUMP CONTROL SYSTEM WITH VARIABLE TEST CYCLE INITIATION FREQUENCY

[75] Inventors: James T. Burrill, Peabody; William Anastos, Belmont, both of Mass.

[73] Assignee: Rule Industries, Inc., Gloucester, Mass.

[21] Appl. No.: 281,231

[22] Filed: Jul. 27, 1994

[51] Int. Cl.$^6$ ................................................. F04B 49/00
[52] U.S. Cl. ............................................ 417/12; 417/44.11
[58] Field of Search ................................ 417/12, 44.11, 417/36; 318/443, 474, 476, 478, 484

[56] References Cited

U.S. PATENT DOCUMENTS

| | | |
|---|---|---|
| 3,283,236 | 11/1966 | Legg . |
| 3,717,420 | 2/1973 | Rachocki . |
| 3,776,661 | 12/1973 | Wohnlich . |
| 3,858,102 | 12/1974 | Quinn . |
| 3,953,777 | 4/1976 | McKee . |
| 4,021,700 | 5/1977 | Ellis-Anwyl . |
| 4,195,968 | 4/1980 | Emeny . |
| 4,241,299 | 12/1980 | Bertone . |
| 4,331,438 | 1/1982 | Comstedt . |
| 4,412,162 | 10/1983 | Kitamura . |
| 4,420,787 | 12/1983 | Tibbits et al. . |
| 4,421,643 | 12/1983 | Frederick . |
| 4,473,338 | 9/1984 | Garmong . |
| 4,505,643 | 3/1985 | Millis et al. . |
| 4,507,055 | 3/1985 | Fair et al. .................................. 417/12 |
| 4,610,605 | 9/1986 | Hartley . |
| 5,076,763 | 12/1991 | Anastas et al. . |

FOREIGN PATENT DOCUMENTS

| | | |
|---|---|---|
| 75201205 | 6/1975 | China . |
| 55-72678 | 5/1980 | Japan . |

*Primary Examiner*—John J. Vrablik
*Assistant Examiner*—Xuan M. Thai
*Attorney, Agent, or Firm*—Dickstein, Shapiro & Morin, L.L.P.

[57] ABSTRACT

A pump control system for adjusting the frequency of operation of a pump motor in accordance with the demand on the pump includes means for periodically actuating the pump motor to initiate operation of the pump at periodic intervals; sensor means for sensing the condition of the operating pump motor; and means responsive to the sensor means for adjusting the periodic interval to conform the operation of the pump motor to demand on the pump.

14 Claims, 3 Drawing Sheets

5,549,456

AUTOMATIC PUMP CONTROL SYSTEM WITH VARIABLE TEST CYCLE INITIATION FREQUENCY

FIELD OF INVENTION

This invention relates to a pump control system for adjusting the frequency of initiation of the test cycle of a pump motor in accordance with the demand on the pump.

BACKGROUND OF INVENTION

Bilge pumps, sump pumps and similar DC or AC electrical powered pumps used to pump out accumulated water traditionally use a float switch for the pump power circuit in which the water level raises and lowers the float sufficiently to close and open the associated switch. Such float switch devices require a number of moving parts which wear or bind and eventually fail; and the wearing and binding is often accelerated by the damp, corrosive and dirty environment in which these float switches are used. Failure of the switch can have catastrophic effects since when the pump does not operate the water accumulates and can flood the area. In the case of bilge pumps, the flooding can sink the vessel.

One attempt to eliminate the need for such float switches includes means to periodically, automatically, e.g., every five minutes, turn on the pump whether or not there is water or liquid buildup. The pump current is then monitored, and, if it is low, a no-load condition is detected and the pump is shut off. If the current is normal, a load condition is detected and the pump is permitted to keep pumping until the water is drained and the low current condition reoccurs. See U.S. Pat. No. 5,076,763, "Pump Control Responsive to Timer, Delay Circuit and Motor Current", assigned to the same assignee.

While this solves the float switch problems, it adds another. Namely, in some installations the noise of the pump turning on every five minutes or for a similar time interval annoys owners, passengers and crew. For, even if no water is present the pump still relentlessly makes noise every five minutes. One attempt to overcome this problem as set forth in copending PCT application, International Application No. PCT/US93/09415, "Soft-Start Pump Control System", filed Oct. 1, 1993, by Anastos et al., assigned to the same assignee and incorporated herein by reference, uses a pump control system for periodically yet quietly operating a pump. The system automatically energizes the pump motor at regular fixed test intervals but at reduced power by reducing the power of the test cycle while sensing the motor current and then stepping up the power if the motor current amplitude indicates that there is liquid to be pumped. That approach can be effectively applied to AC motor applications. In the same manner as DC motors, AC motors also exhibit higher levels of current draw when pumping liquids.

However, a problem still exists in that the pump may be coming on at fixed intervals too infrequently to properly drain the liquid when a serious flooding problem is occurring or is coming on much too often when there is little or no liquid present.

SUMMARY OF INVENTION

It is therefore an object of this invention to provide an improved pump control system for adjusting the frequency of initiation of the test cycle of a pump motor in accordance with the demand on the pump.

It is a further object of this invention to provide such a pump control system which requires less power, reduces noise and prolongs pump and battery life by pumping less frequently when water is absent.

It is a further object of this invention to provide such a pump control system which responds to hazardous conditions by pumping more frequently when water is present.

The invention results from the realization that a truly safe yet efficient pump control system can be effected by providing means for periodically actuating the pump motor to initiate operation of the pump at periodic intervals, sensor means for sensing the condition of the operating pump motor, and means, responsive to the sensor means, for adjusting the periodic interval to conform the operation of the pump motor to demand on the pump.

This invention features a pump control system for adjusting the frequency of operation of a pump motor in accordance with the demand on the pump. There are means for periodically actuating the pump motor to initiate operation of the pump at periodic intervals and there are sensor means for sensing the condition of the operating pump motor. There are also means, responsive to the sensor means, for adjusting the periodic interval to conform the operation of the pump motor to the demand on the pump.

In a preferred embodiment the means for periodically actuating the pump motor may be a periodic test cycle generator. The condition sensed by the sensor means may be current drawn by the pump motor. The means for adjusting may count the number of times that liquid is present and the number of times that the liquid is absent and the periodic interval may be shortened when the number of times that liquid is present exceeds a predetermined number and it may be lengthened when the number of times that liquid is absent exceeds a predefined number. The predetermined number and the predefined number may be three.

This invention also features a pump control system for adjusting the frequency of initiation of the test cycle of a pump motor in accordance with demand on the pump. There are switching means for supplying power to the pump motor. There is also a periodic test cycle generator for periodically actuating the switching means to initiate operation of the pump motor at periodic intervals. There are sensor means for sensing the current drawn by the pump motor and a reference circuit. There are also liquid detector means responsive to the reference circuit and the sensor means for detecting whether liquid is present or absent. There are monitoring means responsive to the liquid detector means for adjusting the periodic interval to conform the operation of the pump motor to the demand on the pump.

In a preferred embodiment the monitoring means may count the number of times in sequence that liquid is present and the number of times in sequence that liquid is absent. The periodic test cycle generator may be responsive to the monitoring means for shortening the periodic interval when the number of times that liquid is present exceeds a predetermined number and for lengthening the periodic interval when the number of times that liquid is absent exceeds a predefined number. The monitoring means may include means for counting the number of times in sequence that liquid is present and the number of times in sequence that liquid is absent. The predetermined number and the predefined number may be the same and the predetermined number and the predefined number may be three. The liquid detector means may continue operation of the pump when the pump motor current exceeds a reference level provided by the reference circuit and deenergize the pump when the pump motor current is below the reference level indicating that no liquid is present. The liquid detector means may include means for overriding the periodic test cycle generator and continuing operation of the pump motor as long as there is liquid present. The sensor means may provide a signal proportional to the current drawn by the pump motor to the liquid detector means. There may further be included filter means for filtering the signal to prevent the generation of a false overload current caused by the initiation of the pump motor.

DISCLOSURE OF PREFERRED EMBODIMENT

Other objects, features and advantages will occur to those skilled in the art from the following description of a preferred embodiment and the accompanying drawings, in which.

The pump control system of this invention may be utilized to adjust the frequency of initiation of the test cycle of a pump motor depending on the demand on the pump. The pump controller of this invention may utilize a soft-start pump control system, as discussed above, disclosed in copending PCT patent application, International Application No. PCT/US93/09415, wherein a pump is periodically, at regular fixed intervals, automatically energized by a reduced power test cycle. Or, the pump motor may simply be energized by a full power test cycle. The motor current is then sensed. If the current amplitude indicates that there is liquid to be pumped the periodic test cycle generator that initiated the test cycle is overridden and the pump motor is energized until the sensed motor current amplitude indicates that there is no more liquid to be pumped. The pump motor is then shut off until the end of the next periodic interval when another test cycle is generated by the periodic test cycle generator and the process begins again. If when the pump motor is energized by the periodic test cycle, the current sensed initially has an amplitude that indicates there is no liquid to be pumped, the pump motor is deenergized and will not be reenergized until the next test cycle is generated at the end of the next fixed interval. The problem with this pump operation is that if there is a serious flooding problem the pump will still continue to only pump after each regular fixed interval and this may not be sufficient to properly pump the incoming water out. Or, if there is little or no liquid present over a period of time the motor will continue to cycle on at the end of each interval when the test cycle generator generates its test cycle signal and it will then shut off after sensing no water present. As discussed above, this can become quite annoying.

Thus, the primary object of the present invention is to increase the frequency of initiation of the pump test cycle when liquid is present (i.e., decrease the periodic time interval between test cycles) and reduce the frequency of initiation of the pump test cycle when liquid is absent (i.e., increase the periodic time interval between test cycles).

Figures 1, 2:
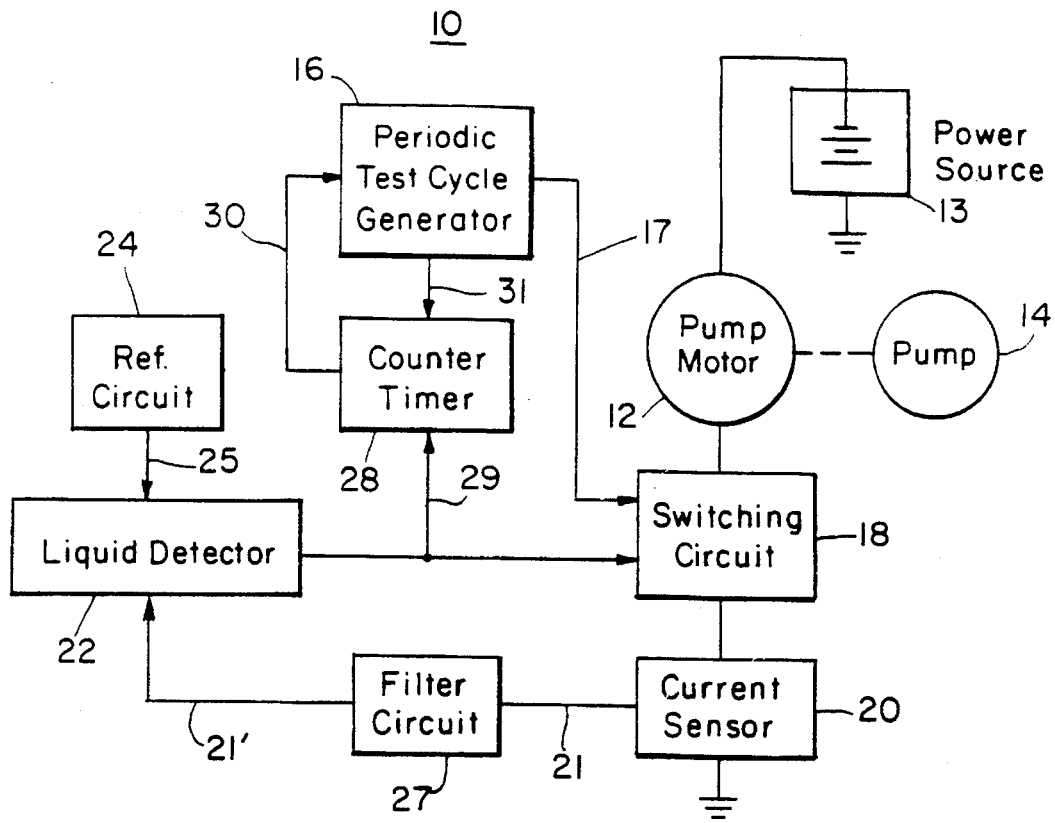
FIG. 1 is a schematic block diagram of a pump control system for adjusting the frequency of initiation of the test cycle of a pump motor in response to demand on the pump in accordance with this invention.
FIG. 2 is a more detailed schematic block diagram of the counter timer of FIG. 1 showing in more detail its operation with the liquid detector and the periodic test cycle generator also of FIG. 1.

There is shown in FIG. 1 a pump control system 10 for adjusting the frequency of initiation of the test cycle of a pump motor 12 in accordance with the demand on the pump 14. There is a periodic test cycle generator 16 which generates a test cycle supplied on line 17 to switching circuit 18. The periodic test cycle generator 16 actuates the switching circuit 18 periodically, for example, every five minutes. Actually, any desired period may be selected: less than one minute, one minute, two minutes; often a range of one to three minutes is satisfactory. The test cycle generator 16 delivers a signal on line 17 to operate switching circuit 18 to allow pump motor 12 to be energized by power source 13. The signal may be a full power test cycle signal or a reduced power test cycle signal as disclosed in co-pending PCT Patent Application No. PCT/US93/09415. This causes the pump motor 12 to operate which in turn actuates pump 14.

Current sensor 20 senses the motor current drawn by pump motor 12 and provides to filter circuit 27 on line 21 a signal proportional to the current sensed. Filter circuit 27 filters out motor noise from the signal. The filtered signal 21' is provided to liquid detector 22. Reference circuit 24 provides a liquid reference signal proportional to the current the motor 12 will draw when pumping liquid on line 25 to liquid detector 22. Liquid detector 22 compares the filtered motor current signal provided from filter circuit 27 to the liquid reference signal provided by reference circuit 24. If the motor current signal exceeds the liquid reference signal, this indicates that there is sufficient water or other liquid to be pumped, thus necessitating the operation of pump motor 12. Accordingly, a signal is provided from liquid detector 22 on line 26 to override the periodic test cycle signal provided on line 17 causing switching circuit 18 to provide power to pump motor 12 at the full available power until the water or liquid is fully pumped.

If the signal provided by filter circuit 27 on line 21' is less than the liquid reference signal provided by reference 24 on line 25, this indicates that there is little or no water or other liquid accumulated and ready to be pumped. Thus, liquid detector 22 provides a signal on line 26 to switching circuit 18 to deenergize pump motor 12 and deactivate pump 14 until the next periodic test cycle signal is generated. If water or liquid was initially detected and the periodic test cycle generator is overridden, the system continues to pump until the motor current sensed by current sensor 20 falls below the liquid reference signal from reference circuit 24. At this time the pump motor 12 is deenergized and pumping ceases until the next periodic test cycle signal is generated.

Every signal provided by liquid detector 22 on line 26 is also provided to counter timer 28 on line 29. Counter timer 28 counts the number of times that liquid detector 22 detects the presence of liquid and the number of times liquid detector 22 detects that there was little or no liquid present. Counter timer 28 operates as follows. Each time periodic test cycle generator 16 initiates a test cycle signal counter timer 28 is enabled. It then counts up if water is present and counts down if no water or negligible water is present. If counter timer 28 reaches a predetermined count (3,5,10,20) in either the up or down direction indicating that there has been an uninterrupted series of indications of water or no water present, respectively, then generator 16 is directed to decrease or increase the frequency of initiation of the test cycle.

For example, if the initial periodic test cycle interval between initiations of the pump motor 12 is set for two minutes, the pump will turn on every two minutes to test for water. If after three test cycles (six minutes), water has not been detected, the periodic test cycle generator 16 may be adjusted so that the test cycle interval is now changed to three minutes and the system will test for water every three minutes. If water is still not detected after three three-minute cycles, the cycle test time may again be increased. The test cycle time may be increased in this manner until some maximum cycle time is reached.

When water is not detected, the number of times the pump turns on and off would be reduced when it is not needed. In the same regard, if after three test cycles, for example, water is detected each time, the test cycle time can be decreased to a test cycle time less than the original setting. And, if after three cycles, for example, at the decreased time, water or liquid is detected each time, the test cycle time can again be decreased until some practical minimum cycle time is reached. This is a very beneficial feature when there are more serious flooding conditions. The numbers given in these examples are only for illustration, and any test cycle time and cycle time adjustment may be utilized.

Counter timer 28, FIG. 2, includes control logic 32 and counter 34. Periodic test cycle generator 16 generates a test cycle at periodic intervals for energizing the pump motor 12, and liquid detector 22 provides a signal on line 26 indicative of whether liquid to be pumped is present or not. This signal is provided on line 29 to control logic 32. Periodic test cycle generator 16 provides control logic 32 with the corresponding test cycle signal on line 31. Control logic 32 then provides counter 34 with an increment signal on line 35 if liquid is detected or a decrement signal on line 36 if no liquid is detected. That is, for the first test cycle that is generated, counter 34, which can count the number of liquid detections as well as the number of times liquid is absent, is incremented or decremented. If, for example, after three periodic test cycles liquid was detected three times, counter 34 would provide periodic test cycle generator 16 with a signal on line 30 to decrease the interval between initiation of test cycles. Similarly, if for example after three test cycles liquid was not detected three times, counter 34 would be decremented three times and it would provide a signal on line 30 to periodic test cycle generator 16 to increase the time interval between initiation of test cycles.

Using three (3) consecutive times liquid is detected or liquid was found to be absent in the above example for either shortening or lengthening the interval between initiation of periodic test cycles is merely for illustration purpose. Any predetermined number of sequential signals from liquid detector 22 indicating that liquid is present could be used to shorten the interval. Similarly, any predefined number of sequential liquid detector signals indicating that no liquid is present could be used to lengthen the time interval between periodic test cycles.

There are various ways in which the counter timer 28 can be used to lengthen or shorten the time interval between initiation of the periodic test cycle generator. If, for example, there is a signal provided to control logic 32 on line 29 indicating that no liquid is present, and previous to this signal a number of liquid present signals, not exceeding the predetermined number, have been received by the counter 34, control logic 32 may send a reset signal to counter 34 on line 37 to reset the liquid present counter to zero. Under the same circumstances, control logic 32 may send a decrement signal on line 36 to counter 34 to merely decrement the number of liquid present signals that have been counted by counter 34. Similarly, if a number of liquid absent signals have been received not exceeding the predefined number and a liquid present signal was received, control logic 32 could send an increment signal on line 35 to counter 34 to increment the count signal or reset the counter to zero.

Figure 3:
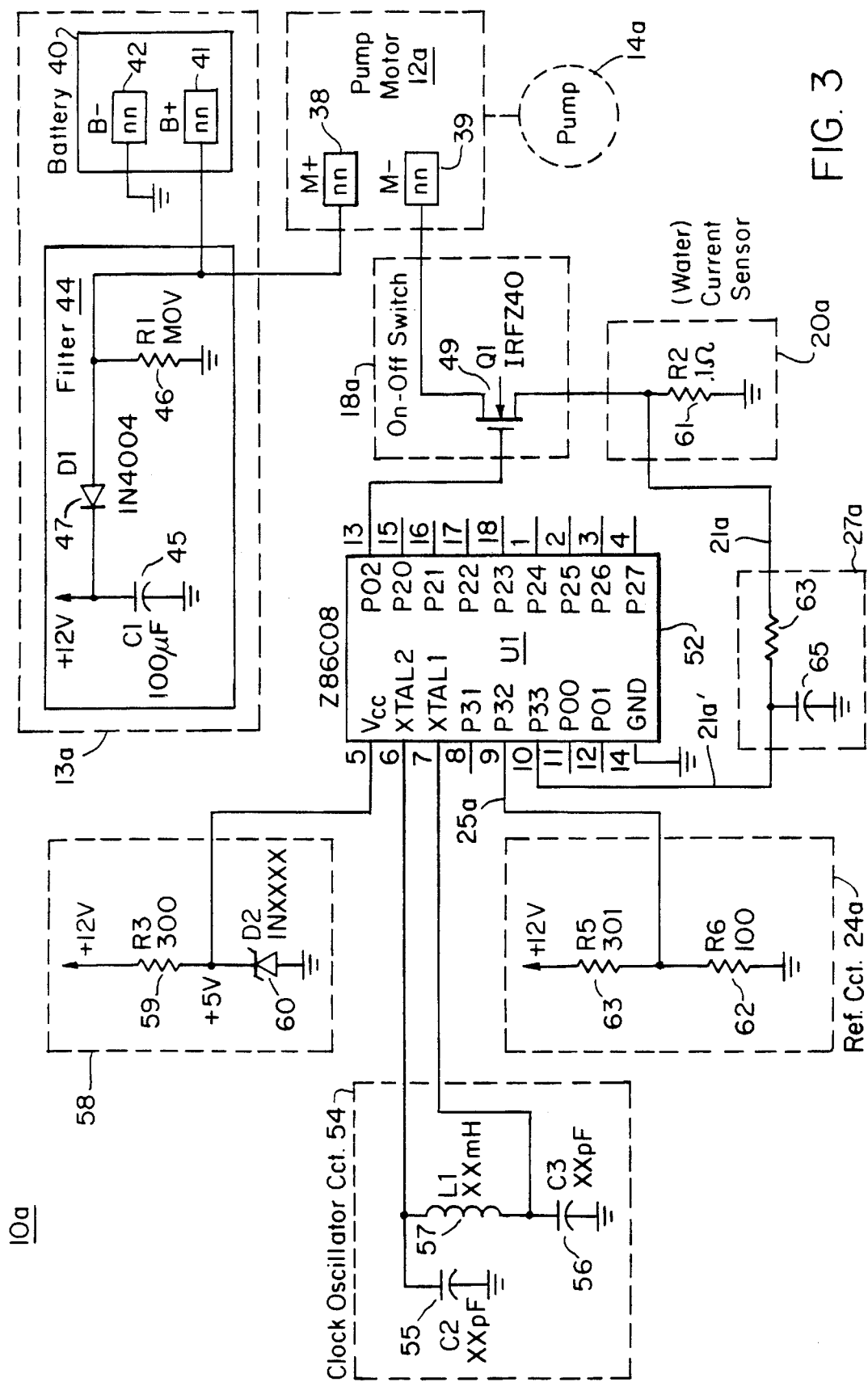
FIG. 3 is a more detailed schematic diagram of the pump control system of FIG. 1.

In another construction pump control system 10*a*, FIG. 3, includes pump motor 12*a* and pump 14*a*. Pump motor 12*a* includes positive and negative terminals 38 and 39, respectively. Pump motor 12*a* may be energized by power source 13*a*. Power source 13*a* includes battery 40 with positive and negative terminals 41 and 42, respectively. Power source 13*a* also includes a filter 44 that includes capacitor 45, metal oxide varistor (MOV) 46 and reverse polarity protection diode 47. The negative terminal 42 of battery 40 is connected to ground and the positive terminal 41 is connected to the filter circuit 44 and positive terminal 38 of pump motor 12*a*. The negative terminal 39 of pump motor 12*a* is connected to switching circuit 18*a* on line 48. Switching circuit 18*a* includes a MOSFET transistor switch 49 for switching on and off the power supplied to pump motor 12*a* from power source 13*a*. Switch 49 is controlled by a signal provided from pin 13 of microprocessor 52 on line 50. Microprocessor 52, which may be a Zylog Z86C08, receives its five-volt power supply from power source 58, which power source includes resistor 59 and Zener diode 60.

The on signal provided to transistor 49 from microprocessor 52 is generated periodically. The interval between periodic test cycles is software controlled. Microprocessor 52 in order to operate requires oscillator circuit 54 which is connected to pins 6 and 7 of microprocessor 52 and which provides it with a clock signal. Clock oscillator circuit 54 includes capacitors 55, 56 and inductor 57.

Transistor 49 of switching circuit 18*a* is switched on in response to a signal from microprocessor 52 generated on line 50 at the proper time for generation of the periodic test cycle. When switch 49 is turned on the circuit is completed between power source 13*a* and pump motor 12*a* and current is drawn by pump motor 12*a*, thereby causing pump 14*a* to rotate. Current sensor 20*a*, which includes resistor 61, monitors the current drawn by pump motor 12*a* and provides a motor current signal proportional to the current drawn to filter circuit 27*a*, which includes resistor 63 and capacitor 65. The filtered signal is provided to pin 10 of microprocessor 52 on line 21*a*'. Microprocessor 52, at pin 9, also receives a liquid reference signal on line 25*a* from reference circuit 24*a* which includes resistors 62 and 63. Microprocessor 52 then determines if the filtered motor current signal on line 21*a*' exceeds the liquid reference signal on line 25*a*, and if it does this indicates that the pump motor 12*a* is under a load condition and liquid, such as water, is present and therefore pumping is required. In this case, microprocessor 52 provides a signal on line 50 to transistor 49 of switching circuit 18*a* to override the periodic test cycle signal and maintain the pumping operation. If, on the other hand, microprocessor 52 determines that the liquid reference signal from reference circuit 24*a* supplied to microprocessor 52 on line 25*a* does not exceed the filtered motor current signal provided on line 21*a*', this indicates that the pump motor is operating in a no-load condition and there is little or no liquid or water to be pumped. Thus, microprocessor 52 provides a signal to transistor 49 switch of switching circuit 18*a* on line 50 to turn off the transistor switch 49, thereby deenergizing the pump motor 12*a* and ceasing operation of pump 14*a*.

The counter timer function, discussed above with regard to FIGS. 1 and 2, is effected in the circuit of FIG. 3 by microprocessor 52. That is, microprocessor 52 counts the successive number of times that it is determined that liquid is present to be pumped or no liquid is present to be pumped, and increases or decreases the frequency of initiation of periodic test cycle generation according to the demand on the pump 14a.

Figure 4:
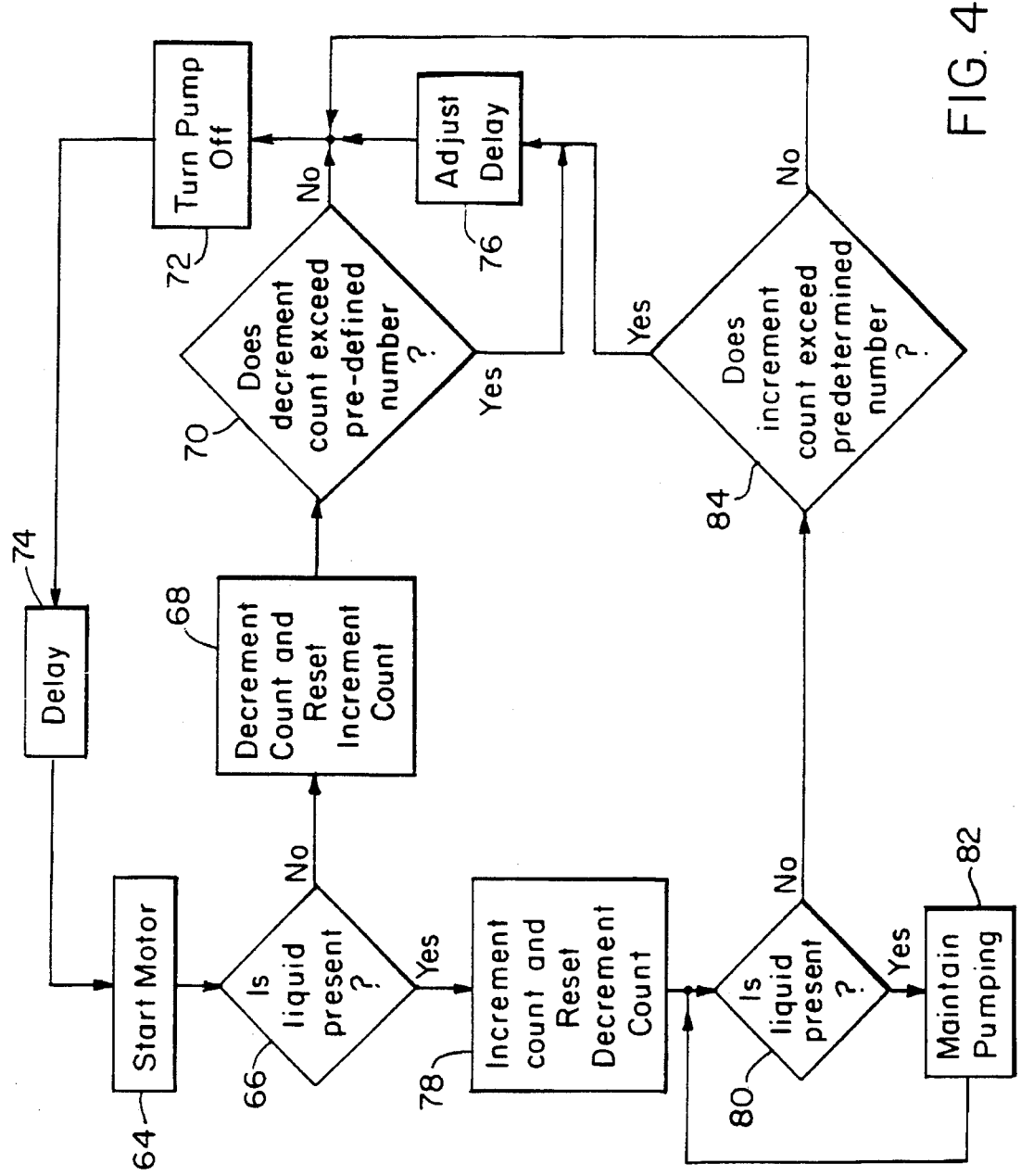
FIG. 4 is flow chart of the software that may be used to operate a microprocessor implementation of the pump control system of FIGS. 1 and 3.
Figure 1:
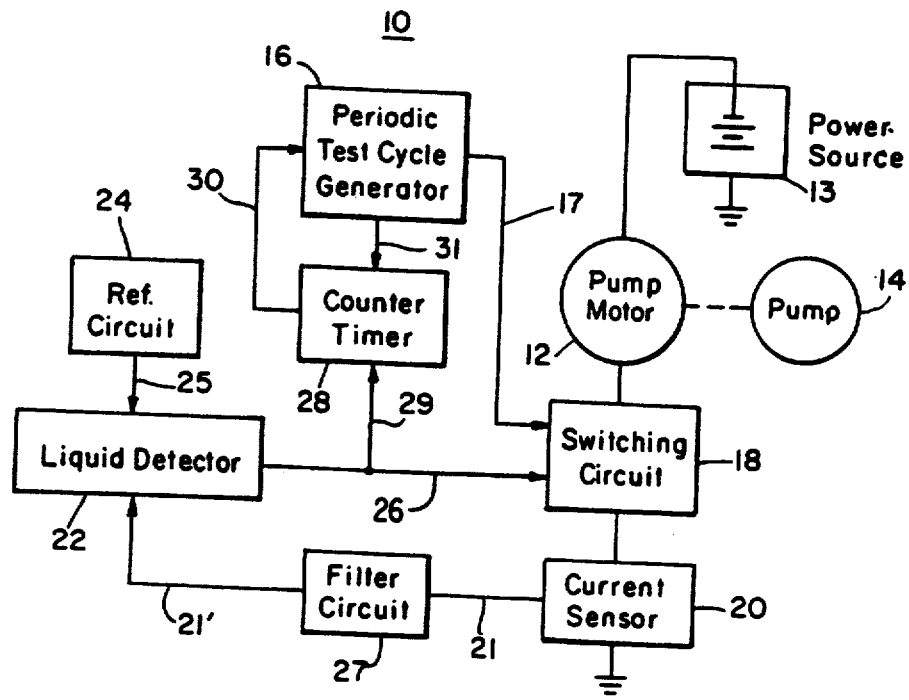
Figure 2:
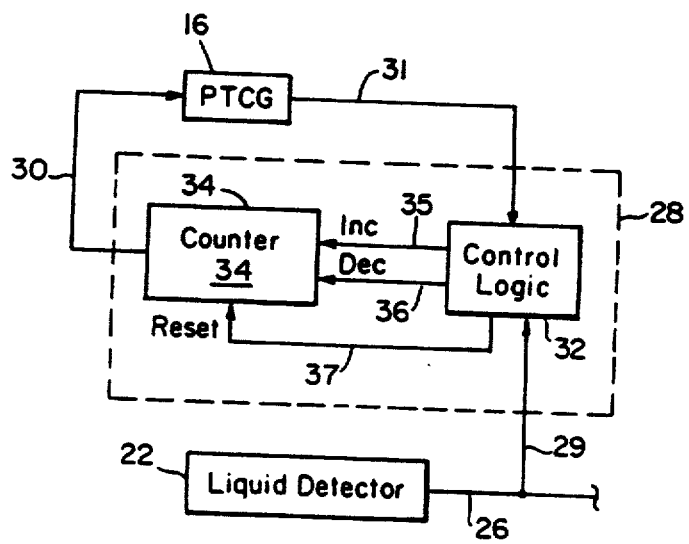
Figure 2:
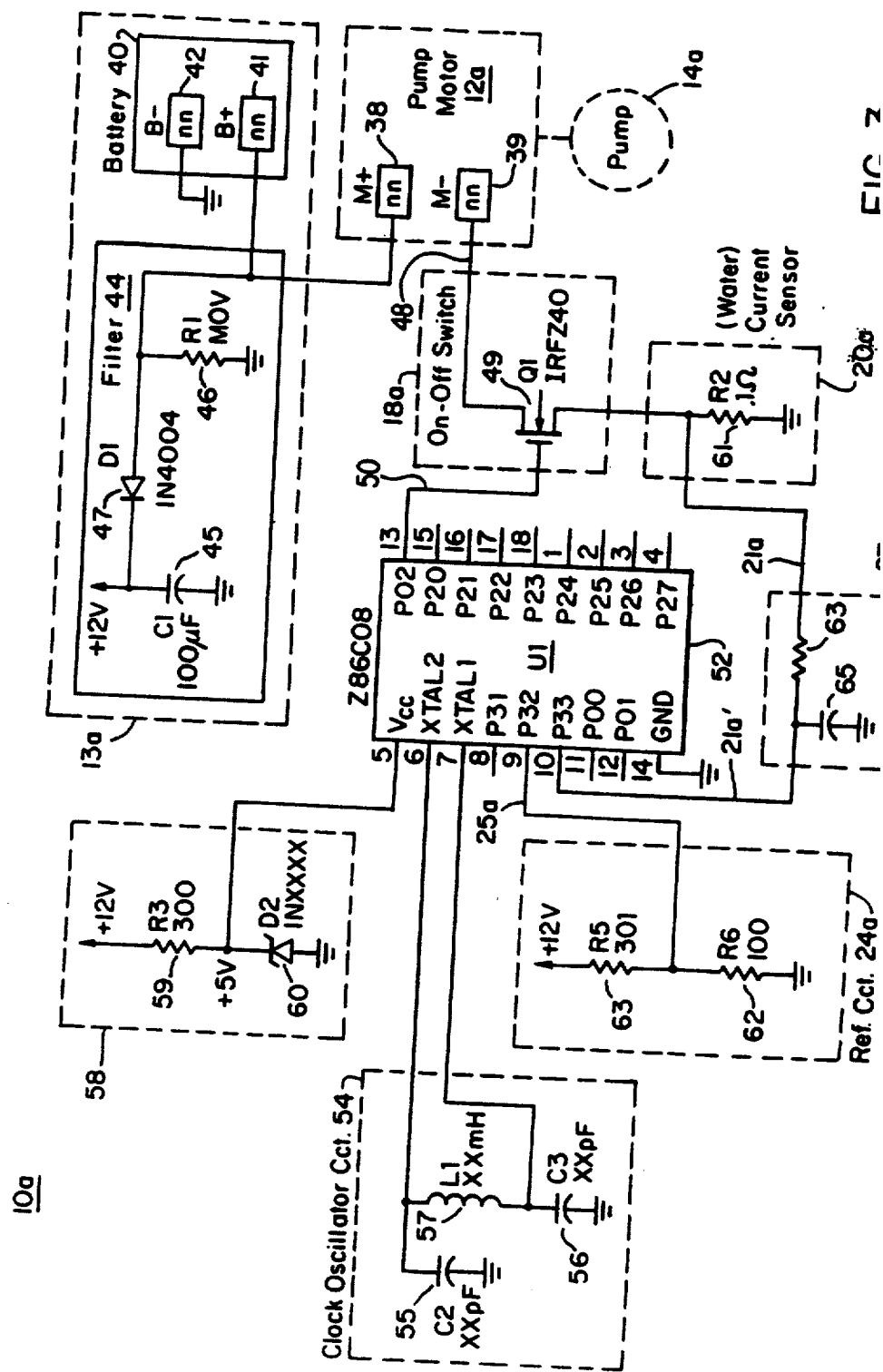

FIG. 4 is a flow chart of the software that may be used to operate microprocessor 52 to implement the pump control system of the subject invention for adjusting the frequency of initiation of the test cycle of a pump motor in accordance with demand on the pump.

The pump motor is started at step 64 and at step 66 it is checked if liquid or water is present to be pumped. If no liquid or water is present to be pumped the system proceeds to step 68, where the count is decremented and the increment count is reset. After the count is decremented the system proceeds to step 70 where it is determined if the decremented count exceeds a predefined number. As discussed above, after a predefined number of cycles where liquid or water is not detected, the time interval between periodic test cycle generation is lengthened. If the number of successive decremental counts does not exceed a predefined number the pump is simply turned off at step 72 and after the next time interval determined by delay 74 the motor is again started at step 64. If at step 70 it is determined that the number of successive decremental counts has exceeded a predetermined number the system proceeds to step 76 where the delay between periodic test cycle generations is increased and the system then proceeds to turn off the pump at step 72. After adjusting the delay generated at step 74 the motor is again started at step 64.

If at step 66 liquid or water is present, the system proceeds to step 78 where the count is incremented and the decrement count is reset. At step 80 it is again determined if liquid or water is present: if liquid or water is present the system proceeds to step 82 and pumping is continued. The system continues to loop through steps 80 and 82 until all the liquid or water is pumped. When no liquid or water is detected the system proceeds to step 84. If at this step it is determined that the incremental count does not exceed a predetermined number the system proceeds to turn off the pump at 72 and start the motor after the delay at step 74. If it is determined at step 84 that the incremental count does exceed the predetermined number the system proceeds to step 76 where the delay is adjusted by shortening the interval between periodic test cycle generation in order to start the motor more frequently due to the recurrent detection of liquid or water.

Although specific features of this invention are shown in some drawings and not others, this is for convenience only as each feature may be combined with any or all of the other features in accordance with the invention.

Other embodiments will occur to those skilled in the art and are within the following claims:

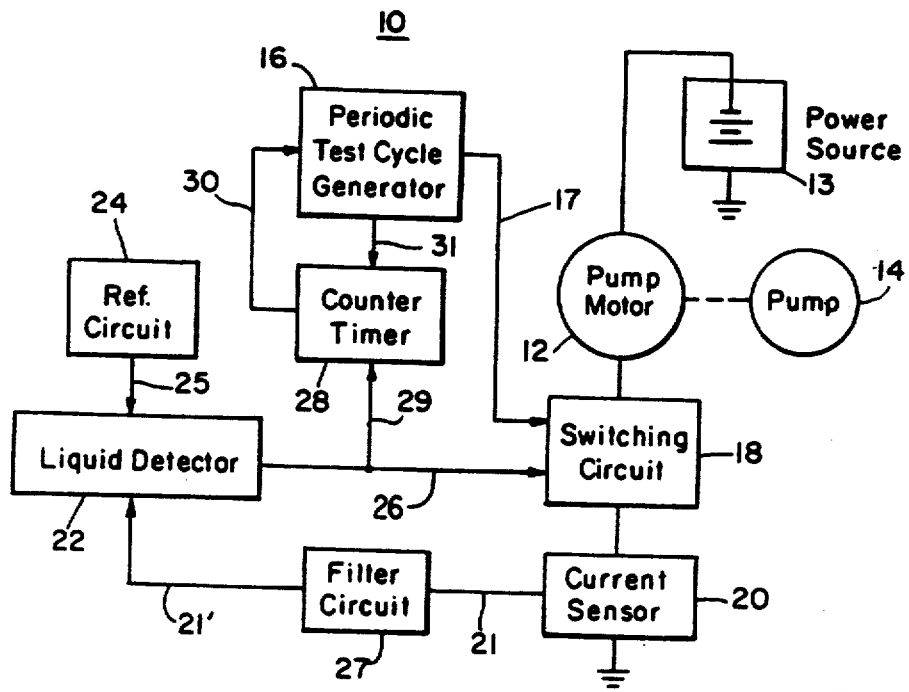

What is claimed is:

1. A pump control system for adjusting the frequency of operation of a pump motor in accordance with the demand on the pump, said pump control system comprising:

means for periodically actuating the pump motor to initiate operation of the pump at periodic intervals;

sensor means for sensing the condition of the operating pump motor; and means, responsive to said sensor means, for adjusting said periodic interval to conform the operation of the pump motor to the demand on the pump, said means for adjusting including means for counting the number of times that liquid is present and the number of times liquid absent.

2. The pump control system of claim 1 in which the periodic interval is shortened when said number of times that liquid is present exceeds a predetermined number and is lengthened when said number of times that liquid is absent exceeds a predefined number.

3. The pump control system of claim 2 in which said predetermined number and said predefined number ar three.

4. The pump control system of claim 1 in which said means for periodically actuating the pump motor is a periodic test cycle generator.

5. The pump control system of claim 1 in which said condition sensed by said sensor means is current drawn by the pump motor.

6. A pump control system for adjusting the frequency of initiation of the test cycle of a pump motor in accordance with demand on the pump comprising:

switching means for supplying power to the pump motor;

a periodic test cycle generator for periodically actuating said switching means to initiate operation of the pump motor at periodic intervals;

sensor means for sensing the current drawn by the pump motor;

a reference circuit;

liquid detector means responsive to said reference circuit and said sensor means for detecting whether liquid is present or absent; and monitoring means, responsive to said liquid detector means, for adjusting said periodic interval to conform the operation of the pump motor to the demand on the pump, said monitoring means including means for counting the number of times that liquid is present and the number of times that liquid is absent.

7. The pump control system of claim 6 in which said periodic test cycle generator is responsive to said monitoring means for shortening said periodic interval when said number of times that liquid is present exceeds a predetermined number and for lengthening said periodic interval when said number of times that liquid is absent exceeds a predefined number.

8. The pump control system of claim 6 in which said monitoring means includes means for counting the number of times in sequence that liquid is present the number of times in sequence that liquid is absent.

9. The pump control system of claim 7 in which said predetermined number and said predefined number are the same.

10. The pump control system of claim 7 in which said predetermined number and said predefined number are three.

11. The pump control system of claim 6 in which said liquid detector means continues operation of the pump when the pump motor current exceeds a reference level provided by said reference circuit indicating liquid is present and deenergizes said pump when the pump motor current is below said reference level indicating that no liquid is present.

12. The pump control system of claim 11 in which said liquid detector means includes means for overriding said periodic test cycle generator and continuing operation of the pump motor as long as there is liquid present.

13. The pump control system of claim 6 in which said sensor means provides a signal proportional the current drawn by the pump motor to said liquid detector means.

14. The pump control system of claim 13 further including filter means for filtering said signal to prevent the generation of a false overload current caused by the initiation of said pump motor.

\* \* \* \* \*

UNITED STATES PATENT AND TRADEMARK OFFICE
CERTIFICATE OF CORRECTION

PATENT NO. : 5,549,456
DATED : August 27, 1996
INVENTOR(S) : Burrill, et al

Page 1 of 4

It is certified that error appears in the above-identified patent and that said Letters Patent is hereby corrected as shown below:

The title page, showing an illustrative figure, should be deleted and substitute therefor the attached title page.

Delete Drawing Sheets 1-2, and substitute therefor the Drawing Sheets, consisting of FIGS. 1-3, as shown on the attached pages.

Signed and Sealed this

Twenty-fifth Day of February, 1997

Attest:

BRUCE LEHMAN

*Attesting Officer*          *Commissioner of Patents and Trademarks*

United States Patent [19]

Burrill et al.

[11] Patent Number: 5,549,456
[45] Date of Patent: Aug. 27, 1996

[54] AUTOMATIC PUMP CONTROL SYSTEM WITH VARIABLE TEST CYCLE INITIATION FREQUENCY

[75] Inventors: James T. Burrill, Peabody; William Anastos, Belmont, both of Mass.

[73] Assignee: Rule Industries, Inc., Gloucester, Mass.

[21] Appl. No.: 281,231

[22] Filed: Jul. 27, 1994

[51] Int. Cl.⁶ ............................................. F04B 49/00
[52] U.S. Cl. ................................... 417/12; 417/44.11
[58] Field of Search ................................ 417/12, 44.11, 417/36; 318/443, 474, 476, 478, 484

[56] References Cited

U.S. PATENT DOCUMENTS

| | | |
|---|---|---|
| 3,283,236 | 11/1966 | Legg . |
| 3,717,420 | 2/1973 | Rachocki . |
| 3,776,661 | 12/1973 | Wohnlich . |
| 3,858,102 | 12/1974 | Quinn . |
| 3,953,777 | 4/1976 | McKee . |
| 4,021,700 | 5/1977 | Ellis-Anwyl . |
| 4,195,968 | 4/1980 | Emeny . |
| 4,241,299 | 12/1980 | Bertone . |
| 4,331,438 | 1/1982 | Comstedt . |
| 4,412,162 | 10/1983 | Kitamura . |
| 4,420,787 | 12/1983 | Tibbits et al. . |
| 4,421,643 | 12/1983 | Frederick . |
| 4,473,338 | 9/1984 | Garmong . |
| 4,505,643 | 3/1985 | Millis et al. . |
| 4,507,055 | 3/1985 | Fair et al. ................. 417/12 |
| 4,610,605 | 9/1986 | Hartley . |
| 5,076,763 | 12/1991 | Anastas et al. . |

FOREIGN PATENT DOCUMENTS

| | | |
|---|---|---|
| 75201205 | 6/1975 | China . |
| 55-72678 | 5/1980 | Japan . |

*Primary Examiner*—John J. Vrablik
*Assistant Examiner*—Xuan M. Thai
*Attorney, Agent, or Firm*—Dickstein, Shapiro & Morin, L.L.P.

[57] ABSTRACT

A pump control system for adjusting the frequency of operation of a pump motor in accordance with the demand on the pump includes means for periodically actuating the pump motor to initiate operation of the pump at periodic intervals; sensor means for sensing the condition of the operating pump motor; and means responsive to the sensor means for adjusting the periodic interval to conform the operation of the pump motor to demand on the pump.

14 Claims, 3 Drawing Sheets